United States Patent [19]
Murty et al.

[11] Patent Number: 6,044,456
[45] Date of Patent: Mar. 28, 2000

[54] ELECTRONIC SYSTEM AND METHOD FOR MAINTAINING SYNCHRONIZATION OF MULTIPLE FRONT-END PIPELINES

[75] Inventors: Keshavram N. Murty, Phoenix, Ariz.; Nazar A. Zaidi, San Jose, Calif.; Darshana S. Shah, Sunnyvale, Calif.; Tse-Yu Yeh, Milpitas, Calif.

[73] Assignee: Intel Corporation, Santa Clara, Calif.

[21] Appl. No.: 09/002,774

[22] Filed: Jan. 5, 1998

[51] Int. Cl.⁷ .................................................. G06F 9/38
[52] U.S. Cl. .......................... 712/219; 712/40; 712/206; 712/212
[58] Field of Search .................................. 712/200, 216, 712/219, 229, 233, 237, 23, 1, 9, 206, 212

[56] References Cited

U.S. PATENT DOCUMENTS

| | | | |
|---|---|---|---|
| 4,982,402 | 1/1991 | Beaven et al. | 371/12 |
| 5,179,763 | 1/1993 | Steeley, Jr. et al. | 395/375 |
| 5,193,206 | 3/1993 | Mills | 395/800 |
| 5,287,467 | 2/1994 | Blaner et al. | 395/375 |
| 5,317,734 | 5/1994 | Gupta | 395/650 |
| 5,428,810 | 6/1995 | Barkans et al. | 395/800 |
| 5,450,555 | 9/1995 | Brown, III et al. | 395/375 |
| 5,748,935 | 5/1998 | Temblay et al. | 395/392 |
| 5,826,069 | 10/1998 | McCullough et al. | 395/561 |
| 5,860,000 | 1/1999 | Biswas et al. | 395/591 |
| 5,867,724 | 2/1999 | McMahon | 395/800 |

Primary Examiner—Meng-Ai T. An
Assistant Examiner—Dzung C. Nguyen
Attorney, Agent, or Firm—Blakely, Sokoloff, Taylor & Zafman LLP

[57] ABSTRACT

A system and method are described for maintaining synchronization of information propagating through multiple front-end pipelines operating in parallel. In general, these multiple front-end pipelines become asynchronous in response to a stall condition and re-establish synchronization by flushing both front-end pipelines as well as by selectively releasing these front-end pipelines from their stall condition at different periods of time.

25 Claims, 6 Drawing Sheets

| Cycle | | IIP | IPG/FE1 | FET/FE2 | ROT/FE3 | Event |
|---|---|---|---|---|---|---|
| EM | 1 | D | C | B | A | TLB_MISS stall signal corresponding to IP "A" is activated. |
| IVE | | D | C | B | A | |
| EM | 2 | D | C | B | X | TLB_MISS stall signal detected by second pipeline; invalidate ROT stage; IP "B" stalled in FET stage; IP "A" of first pipeline is kept in auxiliary pipeline. |
| IVE | | E | D | C | B̶ | |
| EM | 3 | A | C | B | X | BTB_TYPE flush issued by second circuit; load IP "A" into IIP stages; TLB_MISS stall signal is still active. |
| IVE | | A | X | X | X | |
| EM | 4 | B | A | X | X | First pipeline detects BTB_TYPE flush; IP "B" loaded into IIP stages; TLB_MISS stall signal still active. |
| IVE | | B | A | X | X | |
| EM | 5 | C | B/A | X | X | IP "C" loaded into IIP stages but IP "B" loaded into the history queue; TLB_MISS stall signal still active. |
| IVE | | C | B | A | X | |
| EM | 6 | C | B/A | X | X | TLB_MISS stall signal is deactivated; first pipeline is advanced. |
| IVE | | C | B | A | X | |
| EM | 7 | C | B | A | X | IP "B" loaded from history buffer into IPG stage; second pipeline is advanced in the next cycle. |
| IVE | | C | B | A | X | |
| EM | 8 | D | C | B | A | Synchronization re-established. |
| IVE | | D | C | B | A | |

| Cycle | | IIP | IPG/FE1 | FET/FE2 | ROT/FE3 | Event |
|---|---|---|---|---|---|---|
| 1 | EM | D | C | B | A | TLB_MISS stall signal corresponding to IP "A" is activated. |
| | IVE | D | C | B | A | |
| 2 | EM | D | C | B | X | TLB_MISS stall signal detected by second pipeline; invalidate ROT stage; IP "B" stalled in FET stage; IP "A" of first pipeline is kept in auxiliary pipeline. |
| | IVE | E | D | C | B̶ | |
| 3 | EM | A | C | B | X | BTB_TYPE flush issued by second circuit; load IP "A" into IIP stages; TLB_MISS stall signal is still active. |
| | IVE | A | X | X | X | |
| 4 | EM | B | A | X | X | First pipeline detects BTB_TYPE flush; IP "B" loaded into IIP stages; TLB_MISS stall signal still active. |
| | IVE | B | A | X | X | |
| 5 | EM | C | B/A | X | X | IP "C" loaded into IIP stages but IP "B" loaded into the history queue; TLB_MISS stall signal still active. |
| | IVE | C | B | A | X | |
| 6 | EM | C | B/A | X | X | TLB_MISS stall signal is deactivated; first pipeline is advanced. |
| | IVE | C | B | A | X | |
| 7 | EM | C | B | A | X | IP "B" loaded from history buffer into IPG stage; second pipeline is advanced in the next cycle. |
| | IVE | C | B | A | X | |
| 8 | EM | D | C | B | A | Synchronization re-established. |
| | IVE | D | C | B | A | |

*Figure 5*

| Cycle | | IIP | IPG/FE1 | FET/FE2 | ROT/FE3 | Event |
|---|---|---|---|---|---|---|
| 1 | EM | D | C | B | A | MIQ_FULL stall signal activated. |
|   | IVE | D | C | B | A | |
| 2 | EM | E | D | C | B | Invalidate contents of ROT stage to avoid processing IP "B"; MIQ_FULL stall signal still active. |
|   | IVE | E | D | C | B | |
| 3 | EM | A | D | C | B | BAC_TYPE flush issued; MIQ_FULL stall signal still active. |
|   | IVE | A | X | X | X | |
| 4 | EM | B | A | X | X | BAC_TYPE flush used to clear the first pipeline; MIQ_FULL stall signal still active. |
|   | IVE | B | A | X | X | |
| 5 | EM | C | B/A | X | X | Load new IP "C" into the IIP stage and IP "B" into history queue; MIQ_FULL stall signal still active. |
|   | IVE | C | B | A | X | |
| 6 | EM | C | B/A | X | X | MIQ_FULL stall signal still active. |
|   | IVE | C | B | A | X | |
| 7 | EM | C | B/A | X | X | MIQ_FULL stall signal still active. |
|   | IVE | C | B | A | X | |
| 8 | EM | C | B/A | X | X | MIQ_FULL stall signal is deactivated. |
|   | IVE | C | B | A | X | |
| 9 | EM | C | B | A | X | First pipeline active to allow IP "A" to be loaded into the FET stage and IP "B" to be loaded from the history queue to the IPG stage; second pipeline activated in the next cycle. |
|   | IVE | C | B | A | | |
| 10 | EM | D | C | B | A | Synchronization re-established. |
|    | IVE | D | C | B | A | |

*Figure 6*

| Cycle | | IIP | IPG/FE1 | FET/FE2 | ROT/FE3 | Events |
|---|---|---|---|---|---|---|
| 1 | EM<br>IVE | D<br>D | C<br>C | B<br>B | A<br>A | Pipelines are synchronous. |
| 2 | EM<br>IVE | E<br>E | D<br>D | C<br>C | B<br>B | ICACHE_MISS stall signal is activated to stall the first pipeline. IP "B" causes the ICACHE_MISS. |
| 3 | EM<br>IVE | F<br>F | E/D<br>E | C<br>D | B<br>C | ICACHE_MISS now detected by the second pipeline; IP "E" is stored in the history queue; IP "B" has been transmitted to the overflow buffer and saved until I-cache returns code data. IAU then matches up the contents. |
| 4 | EM<br>IVE | F<br>F | E/D<br>E | C<br>D | B<br>C | ICACHE_MISS stall signal is still active |
| 5 | EM<br>IVE | F<br>F | E/D<br>E | C<br>D | B<br>C | ICACHE_MISS stall signal is still active |
| 6 | EM<br>IVE | F<br>F | E/D<br>E | C<br>D | B<br>C | ICACHE_MISS stall signal is deactivated; advance the first pipeline in the next cycle. |
| 7 | EM<br>IVE | F<br>F | E<br>E | D<br>D | C<br>C | The first pipeline is active and advances; the second pipeline is activated to advance in the next cycle. |
| 8 | EM<br>IVE | G<br>G | F<br>F | E<br>E | D<br>D | Synchronization re-established. |

*Figure 7*

| Cycle | | IIP | IPG/FE1 | FET/FE2 | ROT/FE3 | Event |
|---|---|---|---|---|---|---|
| 1 | EM | D | C | B | A | ICACHE_MISS stall signal activated for IP "A"; BTB unit has detected a "taken-branch" prediction for IP "B". |
| | IVE | D | C | B | A | |
| 2 | EM | TB | C | B | A | ICACHE_MISS still active; BTB_TYPE flush is issued while the first pipeline is stalled; Invalidate ROT stage so that IAU does not process IP "B" and IP "B" invalidated on the first pipeline during the next cycle. |
| | IVE | TB | X | X | ~B~ | |
| 3 | EM | TB+1 | TB | ~B~ | A | Invalidate ROT stage so that IP "B" is not processed; ICACHE_MISS still active. |
| | IVE | TB+1 | TB | X | ~B~ | |
| 4 | EM | TB+2 | TB+1/TB | ~B~ | A | Invalidate ROT stage so that IP "B" is not processed; ICACHE_MISS still active; TB+1 stored in history queue. |
| | IVE | TB+2 | TB+1 | TB | ~B~ | |
| 5 | EM | TB+2 | TB+1/TB | ~B~ | A | ICACHE_MISS still active; Invalidate ROT stage. |
| | IVE | TB+2 | TB+1 | TB | ~B~ | |
| 6 | EM | TB+2 | TB+1/TB | ~B~ | A | ICACHE_MISS deactivated; Invalidate ROT stage; Return IP "A" to the IAU. |
| | IVE | TB+2 | TB+1 | TB | ~B~ | |
| 7 | EM | TB+2 | TB+1 | TB | ~B~ | IP "B" needs to be recovered because it has been accidentally invalidated due to branch prediction. |
| | IVE | TB+2 | TB+1 | TB | ~B~ | |
| 8 | EM | B | TB+2 | TB+1 | TB | BAC_TYPE flush is issued; IP "B" is restarted down both pipelines. |
| | IVE | B | X | X | X | |
| 9 | EM | C | B | ~TB+2~ | ~TB+1~ | Pipelines advance. |
| | IVE | C | B | X | X | |
| 10 | EM | D | C | B | ~TB+2~ | Pipelines advance. |
| | IVE | D | C | B | X | |
| 11 | EM | E | D | C | B | Pipelines are synchronized |
| | IVE | E | D | C | B | |

Figure 8

ELECTRONIC SYSTEM AND METHOD FOR MAINTAINING SYNCHRONIZATION OF MULTIPLE FRONT-END PIPELINES

BACKGROUND OF THE INVENTION

1. Field of the Invention

The present invention relates to the field of electronics. More specifically, the invention relates to a system and method for maintaining synchronization of information propagating through multiple, parallel pipelines.

2. Description of Related Art

Early microprocessors included circuitry arranged to process instructions in a serial manner along an instruction pipeline. To improve efficiency, more recent microprocessors (referred to as "pipelined microprocessors") have been designed to operate on several instructions simultaneously. This has been accomplished by overlapping operations performed during the "front-end" stages (e.g., the first few processing stages) of an instruction pipeline and operations performed during the "back-end" stage (e.g., the last few processing stages) of the instruction pipeline. In addition, selected processing stage(s) may be divided into substages for additional performance improvement as found in deeply pipelined microprocessors such as PENTIUM® PRO or PENTIUM® II which are produced by Intel Corporation of Santa Clara, Calif.

Until now, the need for multiple front-end pipelines has not surfaced. Currently, one reason for the lack of multiple front-end pipelines in microprocessors may be due to complexity or inapplicability with the architecture. If two or more parallel front-end pipelines are in operation (i.e., performing their own tasks but on the same instruction pointer "IP"), each corresponding stage of these front-end pipelines must match in validity and in information content. Thus, the front-end pipelines are required to maintain a synchronous relationship with each other.

If multiple front-end pipelines are implemented, the size of the logic structures supporting the front-end pipelines would likely prevent themselves from being placed in close proximity to each other. This would cause a delay in communicating events from one front-end pipeline to another. Examples of an "event" may include (i) a stall condition which halts the propagation of information (e.g., one or more instruction pointers "IPs") through these multiple front-end pipelines until the stall condition is deactivated or (ii) a flush condition which typically causes all information remaining in the front-end stages of a front-end pipeline to be invalidated. Since an event would be detected by one front-end pipeline before another, information in one front-end pipeline may become misaligned with corresponding information of the other front-end pipeline. Thus, these front-end pipelines would become asynchronous.

Hence, it would be advantageous to provide a system and method to maintain synchronization of the front-end stages of multiple front-end pipelines and to provide a synchronization scheme after the occurrence of an event which may cause the front-end pipelines to temporarily become asynchronous to each other.

SUMMARY OF THE INVENTION

In one embodiment, a method is described for maintaining synchronization of information propagating through a plurality of front-end pipelines operating in parallel. In general, these front-end pipelines become asynchronous to each other in response to an event. Thereafter, a plurality of operations are performed to synchronize these front-end pipelines to each other.

BRIEF DESCRIPTION OF THE DRAWINGS

The features and advantages of the present invention will become apparent from the following detailed description of an embodiment of the present invention in which.

DESCRIPTION OF THE PREFERRED EMBODIMENT

A system and method are described for maintaining synchronization of information propagating through front-end stages of multiple instruction pipelines operating in parallel. In general, these multiple pipelines become asynchronous in response to a stall condition and re-establish synchronization by flushing both front-end pipelines as well as by selectively releasing these front-end pipelines from their stall condition at different periods of time.

Herein, a number of terms are frequently used to describe certain hardware and characteristics. For example, a "microprocessor" is a single integrated circuit (IC) component or multiple IC components having information processing capabilities. An "electronic system" is broadly defined as any product featuring a microprocessor such as any type of computer (e.g., desktop, laptop, hand-held, server, etc.), a wireless telephone and any other peripheral. A "signal line" is broadly defined as any information-carrying medium such as one or more electrical wire(s), bus trace(s), fiber optic(s) as well as wireless communication channel(s). "Information" includes data, validity, and/or address (e.g., instruction pointer "IP") and/or control (e.g., opcode). The terms "younger" and "older" for IPs are used to indicate whether an IP has been inserted into the same front-end pipeline after or before another IP, respectively.

Figure 1:
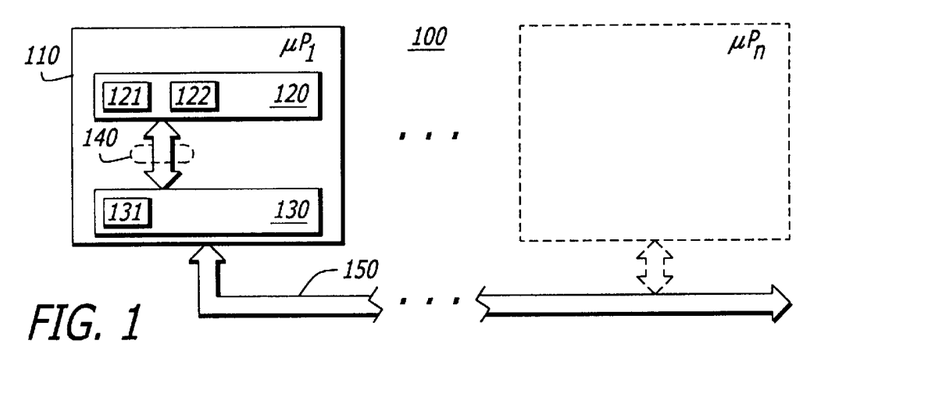
FIG. 1 is a block diagram of an electronic system implemented with a microprocessor adapted to process multiple, parallel front-end pipelines.

Referring to FIG. 1, an illustrative embodiment of an electronic system 100 featuring the present invention is shown. The electronic system 100 includes at least one microprocessor 110 connected to a signal line 150 such as a processor bus adaptive to a chipset. Microprocessor 110 includes a first circuit 120 to control propagation of information through the front-end stage of a first (Enhancement Mode "EM") front-end pipeline (referred to as "the first front-end pipeline") 200 of FIG. 2 and a second circuit 130 to control the propagation of information through the front-end stages of a second (INTEL® Value Engine "IVE") front-end pipeline 250 of FIG. 2 (referred to as "the second front-end pipeline"). The first and second circuits 120 and 130 are connected together through an interface 140 as described in FIG. 3. It is contemplated that "n" microprocessors may be implemented in electronic system 100 ("n" is a positive whole number) as shown by the dashed line representation.

As shown in FIG. 1, first circuit 120 includes at least one or more information storage elements 121 (e.g., an instruction cache "I-cache" and/or translation lookaside buffer "TLB") and a history queue 122. The history queue 122 is used for IP insertion into a selected processing stage of first front-end pipeline 200 such as an "IPG" stage 220 described below in FIG. 2. Although not shown in FIG. 1, one embodiment of history queue 122 includes a multiplexer and a storage element. The multiplexer includes at least two inputs where one input is configured to receive the unqueued IP and the another input is connected to the storage element. The selection of the multiplexer is controlled from activation or deactivation of a stall condition by first circuit 120. The storage element may include a buffer which contains a selected number of IPs younger than the reference IP. This allows history queue 122 to hold at least two cycles worth of information in one front-end pipeline stage.

Figure 2:
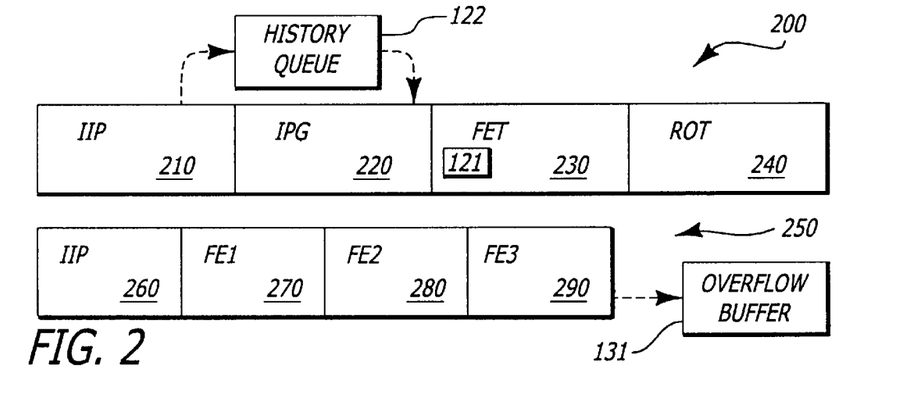
FIG. 2 is a block diagram of a front-end portions of multiple instruction pipelines in the microprocessor of FIG. 1.

Second circuit 130 includes circuitry operating as an instruction fetch unit (IFU), a branch target buffer (BTB) unit and an overflow buffer 131. The IIP stage continually generates a stream of aligned IPs that advance through second front-end pipeline 250. The BTB unit also handles the synchronization in addition to its main duty of branch prediction. The overflow buffer 131 temporarily stores information output from an "FE3" stage in the last clock cycle as shown in FIG. 2. The overflow buffer 131 provides a mechanism to retrieve information prematurely "overflowing" from (i.e., propagated out of) second front-end pipeline 250 of FIG. 2.

These circuits 120 and 130, corresponding to front-end pipelines 200 and 250 of FIG. 2, are physically separated by a distance that may cause an event (e.g., stall, flush, etc.) involving one front-end pipeline to go undetected by another front-end pipeline until the next clock cycle. This causes these front-end pipelines to become asynchronous, and as described below, requires circuitry and a corresponding method to re-synchronize these front-end pipelines.

Referring now to FIG. 2, stages of both first front-end pipeline 200 and second front-end pipeline 250 are shown. In one embodiment, the processing stages of first front-end pipeline 200 include an Input Instruction Pointer (IIP) stage 210, an Instruction Pointer Generation (IPG) stage 220, a Fetch (FET) stage 230 and a Rotate (ROT) stage 240. During IIP stage 210, an instruction pointer (IP) is generated and inserted into first front-end pipeline 200 to be later used for accessing information from information storage elements such as I-cache, TLB and/or any other type of storage device.

Figure 5:
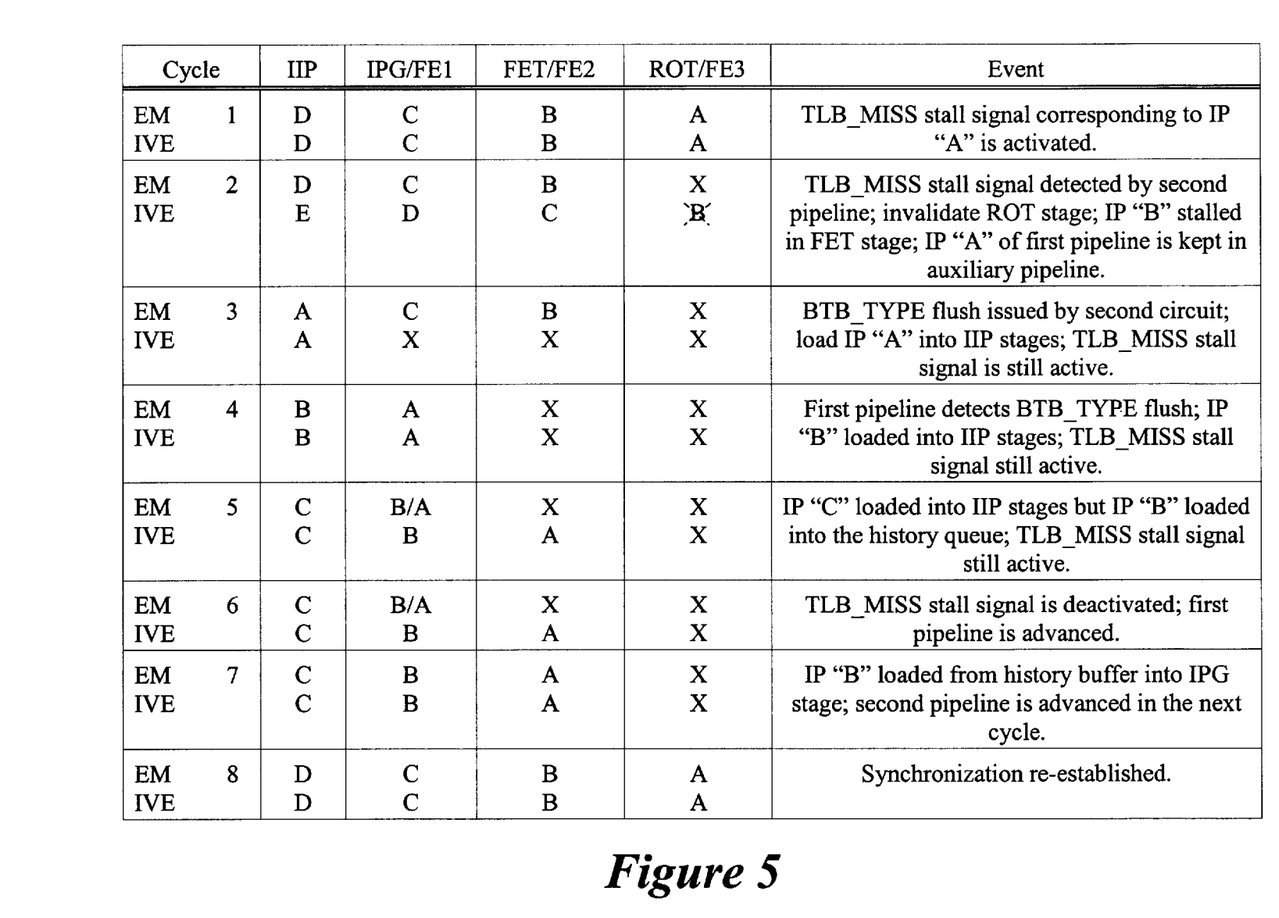
FIG. 5 is an illustrative embodiment of the synchronization scheme of FIG. 4 in response to a TLB_MISS stall condition that originates in the first front-end pipeline.

During IPG stage 220, microprocessor 110 of FIG. 1 may substitute an IP older than the current IP from IIP stage 210 during a transfer to the FET stage 230. Typically, this substitution is provided from history queue 122 to avoid an overwriting condition which may occur when first front-end pipeline 200 is able to accept new data even after being stalled as shown in FIG. 5. This allows first front-end pipeline 200, lagging second front-end pipeline 250 by a single clock cycle during a stall condition, to become more easily re-synchronized with second front-end pipeline 250.

During FET stage 230, an IP is used to fetch information (e.g., opcode) from information storage element(s) 121 and to perform TLB lookup in parallel. If the information cannot be timely accessed or translated (by TLB), a stall condition is asserted in the following cycle. If the information can be timely accessed or translated, this resultant information may be manipulated during the ROT stage 240 in order to account for size differences (in bytes) between the hardware of electronic system 100 and the resultant information processed by the electronic system 100. In addition, a self modifying code (SMC) event may occur upon detection of an attempt to dynamically update code space associated with an in-flight IP. However, unlike the other events, the SMC event does not cause a stall condition; instead, the SMC event is handled exclusively by circuitry associated with second front-end pipeline 250.

The second front-end pipeline 250 includes a plurality of front-end pipeline stages corresponding to those stages associated with first front-end pipeline 200. These stages include the IIP stage 260, a first front-end stage (FE1) 270, a second front-end stage (FE2) 280 and a third front-end stage (FE3) 290. Similarly, during IP stage 260, an IP, identical to the one entering first front-end pipeline 200, enters the second front-end pipeline 250. The remaining stages (FE1, FE2 and FE3 stages) are used to keep track of validity bits and to stage IP information. Overflow buffer 131 is arranged to receive information output from the FE3 stage 290 and to store that information for at least a single clock cycle.

When microprocessor 110 is placed in an IVE mode, the state of validity of each stage of second pipeline 250 represents the state of a corresponding stage in first pipeline 200. For example, during IVE mode, if the FE3 stage is invalidated, information associated with the ROT stage in first pipeline 200 will not be utilized. Meanwhile, when microprocessor 110 is placed in an EM mode, the contents of second pipeline 250 are not utilized. Rather, only the contents supplied by the first pipeline 200 are used. Herein, our discussion will focus on the operations of microprocessor 100 during the IVE mode where synchronization of both pipelines is critical.

Figure 3:
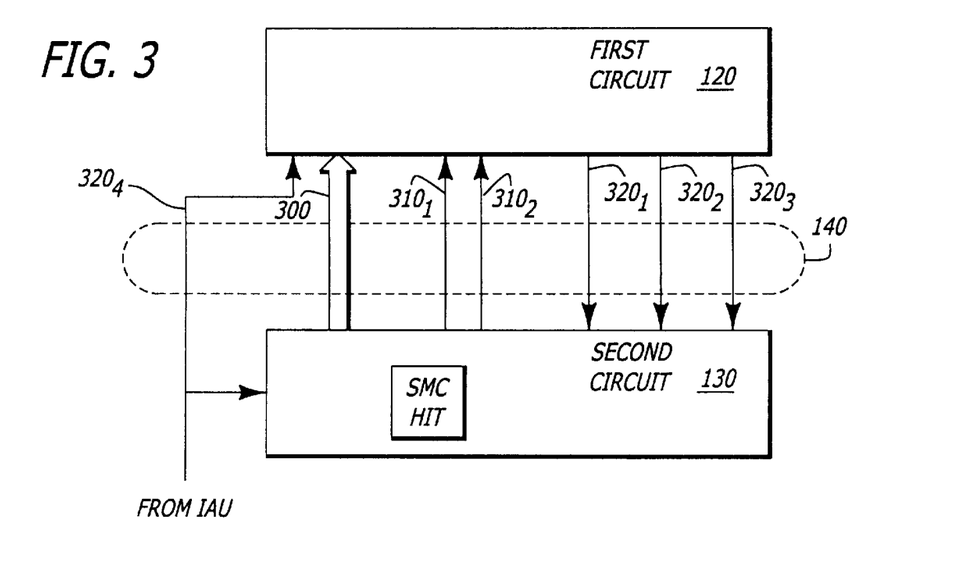
FIG. 3 is a block diagram of logic circuitry implemented within the microprocessor of FIG. 1 which are used to re-synchronize the multiple parallel front-end pipelines of FIG. 2.

Referring to FIG. 3, an illustrative embodiment of interface 140 is shown which is implemented between circuitry 120 and 130 to maintain synchronization of front-end pipelines 200 and 250 of FIG. 2. The interface 140 transfers an IP and various signals representing an occurrence of an event (e.g., flush and stall) over signal lines 300, $310_1$–$310_2$ and $320_1$–$320_4$. More specifically, a first signal line 300 provides a linear IP which represents the address of a request to fetch information (e.g., code data) from cache memory or to perform a TLB lookup. The IP may be accompanied by either a request signal to indicate that the IP is valid and/or a flush signal.

Herein, a "flush signal" is generally described as a control signal which indicates that a flush condition has occurred, leading to the invalidation of information in second front-end pipeline 250. Thus, to maintain synchronization, corresponding information needs to be invalidated in first front-end pipeline 200. As shown in this embodiment, two flush signals are used in connection with other control signals (not shown) to invalidate information on both front-end pipelines 200 and 250. These flush signals include a "BAC_TYPE" flush signal routed through a second signal line 310₁ and a "BTB_TYPE" flush signal routed through a third signal line 310₂.

In reference to both FIGS. 2 and 3, the activation of BAC_TYPE flush signal causes multiple events to occur: (i) invalidation of information either in the FE1, FE2 and FE3 stages 270, 280 and 290 on the same clock cycle as the activation of BAC_TYPE flush signal; and (ii) invalidation of information in the FET stage 230 and the ROT stage 240, advancement of the IP currently residing in the IIP stage 210 to the IPG stage 220, and cancellation of particular stall conditions (e.g., an I-cache miss and a TLB miss) on the next clock cycle. Activation of the BTB_TYPE flush signal, however, results in (i) the invalidation of information at the FE1 and FE2 stages 270 and 280 (for prediction) or FE1, FE2 and FE3 stages 270, 280 and 290 (for synchronization) on the same clock cycle, and (ii) invalidation of information at the FET stage 230 and the advancement of the IP residing in the IIP stage 210 to the IPG stage 220 on the next clock cycle. In sum, either flush condition overrides the stall condition recognized by first front-end pipeline 200 for one clock (now IPs may be loaded upto the IPG stage). The flush condition also overrides the stall condition recognized by second front-end pipeline 250 for two clock cycles (new IPs may be loaded up to the FE2 stage).

As further shown in FIGS. 2–3, interface 140 supports notification of a stall condition between front-end pipelines 200 and 250 via a plurality of stall signals; namely a TLB_OP stall signal, a TLB_MISS stall signal, an ICACHE_MISS stall signal and a MIQ_FULL stall signal. Associated with the FET stage 230, the "TLB_OP" stall signal indicates that the TLB in the microprocessor is already in use and cannot timely service an in-flight IP in the FET stage 230. The other three stall conditions are associated with the in-flight IP in the ROT stage 240. For example, the "TLB_MISS" stall signal indicates that a particular IP does not have a translation in the TLB. The "ICACHE_MISS" stall signal is active when information corresponding to a particular IP is not available in the I-cache. The "MIQ_FULL" stall signal indicates that a micro-instruction queue in the IAU (the next block in the front-end pipeline after the FE3 stage) is full and cannot accept the I-cache information returned in the FE3 stage 290.

Figure 4:
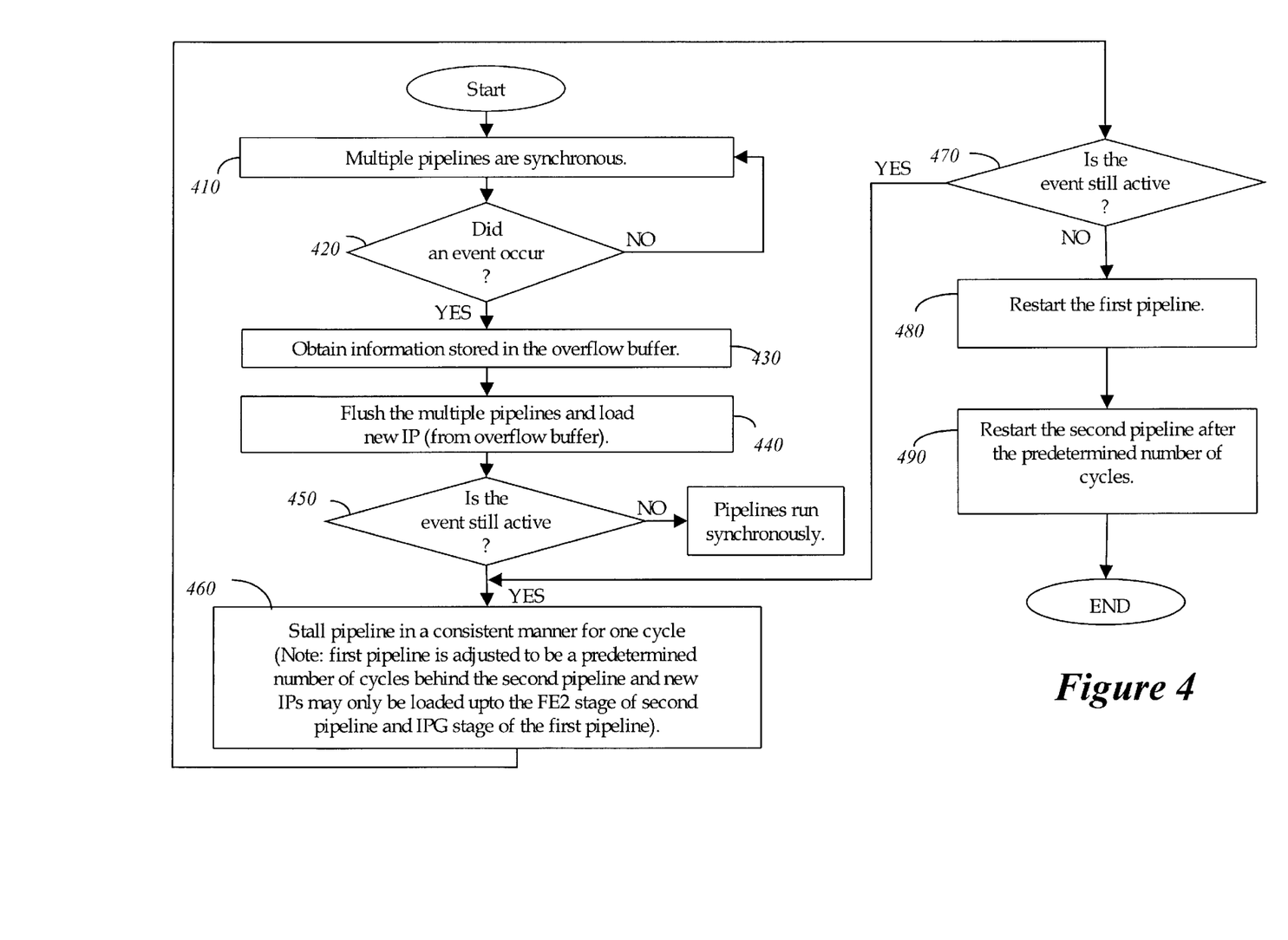
FIG. 4 is an illustrative flowchart of the operational steps performed to maintain synchronization of information between multiple parallel front-end pipelines.

As shown in FIG. 4, a procedure to re-synchronize multiple parallel front-end pipelines after an event which causes these front-end pipelines to become asynchronous is described. First, the multiple front-end pipelines are placed synchronous to each other (Block 410). Thereafter, an event is initiated either by circuitry controlling the first front-end pipeline or by circuitry controlling the second front-end pipeline (Block 420). If an event occurs, the front-end pipelines become asynchronous to each other. For example, a stall condition originating from circuitry controlling the first front-end pipeline causes the second front-end pipeline to lead the first front-end pipeline by at least one cycle. This asynchronous condition occurs due to signal latency between circuitry controlling the front-end pipelines.

Next, circuitry controlling the second front-end pipeline (e.g., BTB unit) obtains an IP which is propagated from the FE3 stage of the second front-end pipeline to be stored in the overflow buffer (Block 430). Then, the first and second front-end pipelines are flushed and loaded with that IP for re-synchronization purposes (Block 440). If the event is still active after both front-end pipelines have undergone a flush condition, the stall condition remains applied to front-end pipelines 200 and 250 to prevent propagation of IPs beyond the IPG stage of the first front-end pipeline and the FE2 stage of the second front-end pipeline (Blocks 450–470).

Upon deactivation of the stall condition (Block 470), the first front-end pipeline continues propagation of information a predetermined number "t" of cycles (e.g., $t \geq 1$) before the second front-end pipeline becomes active (Blocks 480 and 490). This allows the first front-end pipeline to again become synchronous with the second front-end pipeline. Examples of the operations of this procedure are set forth in FIGS. 5, 6, 7 and 8 which are shown below for illustrative purposes.

Referring now to FIG. 5, an illustrative table featuring the flow of information through the front-end processing stages of first and second front-end pipelines 200 and 250 of FIG. 2 is shown. Herein, information includes IPs which are represented as letters "A", "B", "C", "D" and "E". These IPs are sequential aligned IPs where each IP is a result of incrementing a previous IP by a predetermined number of bytes (e.g., 32 bytes). For example, IP "B" is based on IP "A".

In a first cycle (cycle 1), a TLB_MISS stall signal is activated by the first circuit when the first (EM) front-end pipeline is synchronized with the second (IVE) front-end pipeline. In the second cycle (cycle 2), the first and second front-end pipelines become asynchronous to each other because the first front-end pipeline is stalled at cycle 1 while the second front-end pipeline does not detect the TIB_MISS stall signal until cycle 2. As a result, the content of the second front-end pipeline now differs from the content of the first front-end pipeline. Thus, the asynchronization of first and second front-end pipelines is caused by signal latency between the front-end pipelines. In particular, for the second pipeline, IP "B" is forcibly invalidated (represented by dotted lines) and IP "A" has been output from the second front-end pipeline into the overflow buffer. For the first front-end pipeline, IP "B" is stalled in the FET stage and IP "A" is loaded into an auxiliary pipeline (TLB_MISS pipeline). IP "A" maintains its active state in the auxiliary pipeline until the TLB_MISS stall signal is deactivated.

In a third cycle (cycle 3), the second circuit issues a BTB_TYPE flush which invalidates data on the FE1, FE2 and FE3 stages of the second front-end pipeline as evidenced by "X" and loads IP "A" into the IIP stages of the first and second front-end pipelines. At cycle 4, the first circuit detects the BTB_TYPE flush signal while IP "B" is loaded into the IP stages of the first and second front-end pipelines. As a result, the IP currently residing at the FET stage is invalidated while the IP residing at the ROT stage is of no consequence since in IVE mode, the FE3 stage is already invalid to further invalidate the ROT stage.

During the next cycle (cycle 5), the TLB_MISS stall signal is still active. A new IP "C" is loaded into the IP stages of both front-end pipelines since IP "B" is loaded into a storage element of the history queue associated with the IPG stage. This sets the first front-end pipeline to lag the second front-end pipeline by a predetermined number of cycles (e.g., one cycle).

At cycle 6, TLB_MISS stall signal is deactivated by the first circuit. As a result, in cycle 7, IP "A" is transferred to the FET stage while the younger IP (IP "B") remains in the IPG stage. During cycle 8, the second circuit detects that TLB_MISS stall signal has been deactivated and advances the second front-end pipeline. At this time, the front-end pipelines have re-established a synchronous relationship.

Figure 6:
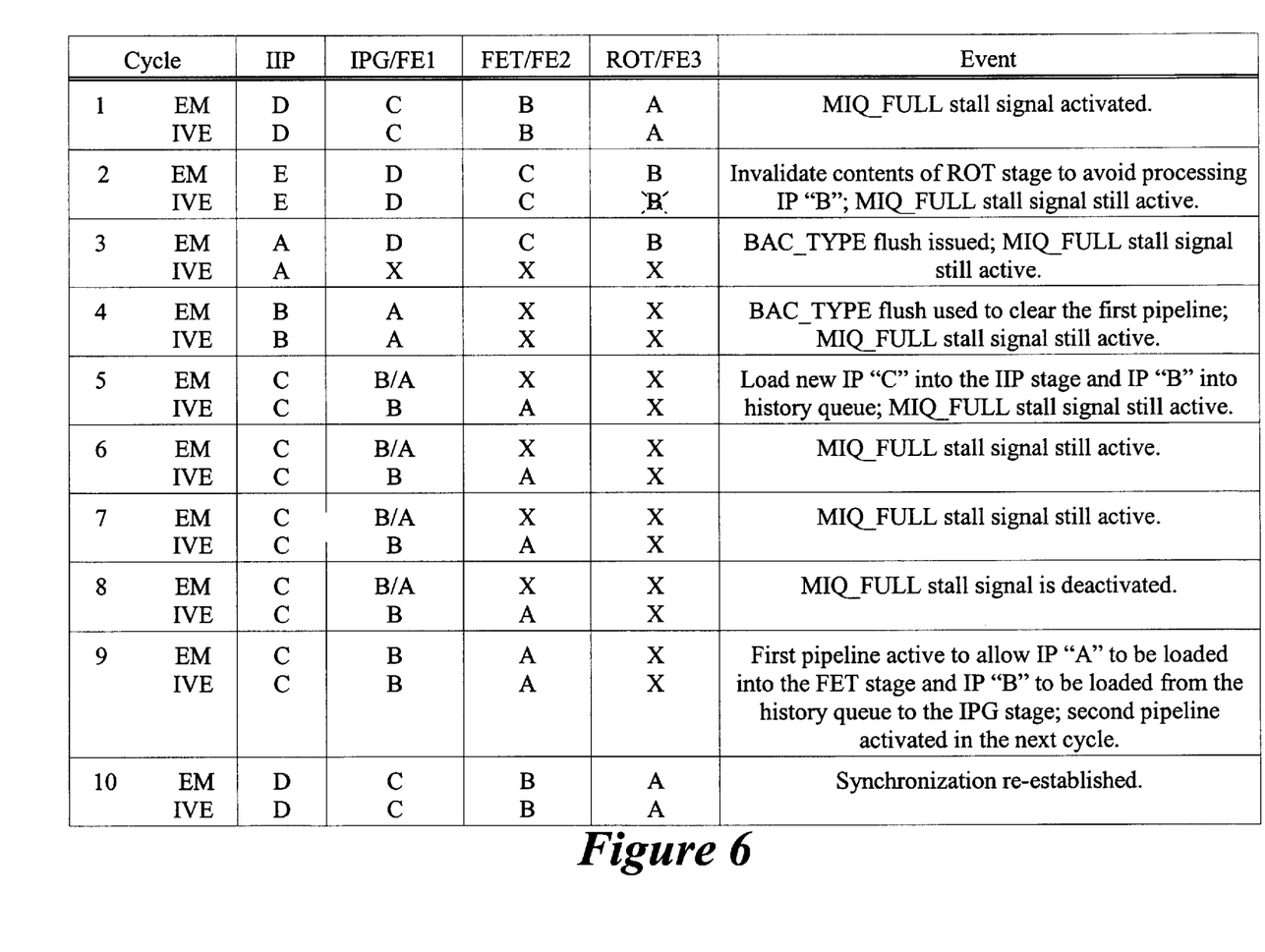
FIG. 6 is an illustrative embodiment of the synchronization scheme of FIG. 4 in response to a MIQ_FULL stall condition that originates in the second front-end pipeline.

Referring now to FIG. 6, a table illustrating the contents of the first and second front-end pipelines in response to assertion of a MIQ_FULL stall signal is shown. In a first cycle (cycle 1), a MIQ_FULL stall signal is activated when the micro-instruction queue is full and cannot receive information associated with IP "A". In the second cycle (cycle 2), a new IP "E" is loaded into the IIP stages of the first and second front-end pipelines while IP "B" currently contained in the ROT stage is forcibly invalidated so that the next stage will not process IP "B". Instead, IP "B" will be subsequently re-inserted into both front-end pipelines by the BTB unit.

During cycle 3, the second circuit issues a BAC_TYPE flush which invalidates information on the FE1, FE2 and FE3 stages of the second front-end pipeline and loads IP "A" into the IIP stages of the first and second front-end pipelines. At cycle 4, the first circuit detects the BAC_TYPE flush signal to invalidate the in-flight IPs in the FET and ROT stages and to re-load IP "B" into the IIP stages of the first and second front-end pipelines. During the next cycle (cycle 5), the MIQ_FULL stall signal is still activated because the micro-instruction queue is still full. At this time, a new IP "C" is loaded into the IIP stages of both front-end pipelines and IP "B" is loaded into a storage element of the history queue associated with the IPG stage. At this point, no further IPs may be loaded into the front-end pipelines until the stall condition is removed as shown in cycles 6 and 7.

At cycle 8, for example, the MIQ_FULL stall signal is deactivated. As a result, the first front-end pipeline is advanced to continue its propagation of information by loading IP "A" into the FET stage while maintaining IP "B" in the IPG stage as shown in cycle 9. Thereafter, in cycle 10, the first and second front-end pipelines start advancing to maintain synchronization of the first and second front-end pipelines.

Figure 7:
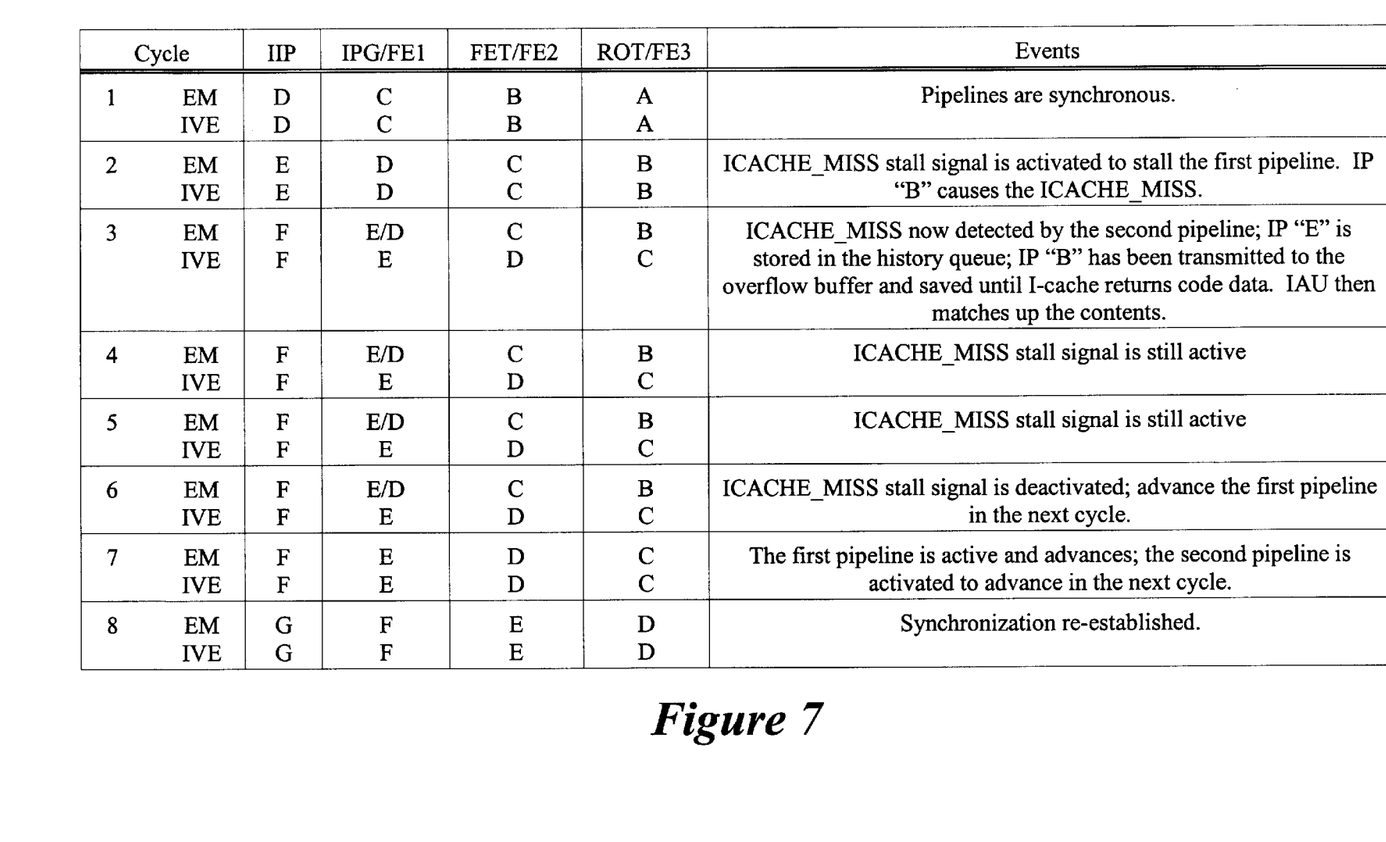
FIG. 7 is an illustrative embodiment of the synchronization scheme of FIG. 4 in response to a ICACHE_MISS stall condition that originates in the first front-end pipeline.

Referring now to FIG. 7, a table illustrating the contents of the multiple front-end pipelines in response to a ICACHE_MISS stall signal is shown. Herein, information includes sequential aligned IPs which are represented as letters "A", "B", "C", "D" "E", "F" and "G". In a first cycle (cycle 1), the multiple front-end pipelines are synchronized with each other. During cycle 2, an ICACHE_MISS stall signal is initiated by the first circuit. This causes the first and second front-end pipelines to become asynchronous to each other. More specifically, in cycle 3, the first front-end pipeline allows a new IP "F" to be loaded into its IIP stage because IP "E" is loaded into the storage element of history queue. However, since the second front-end pipeline did not detect the ICACHE_MISS stall signal until cycle 3, IP "B" has overflowed from the second front-end pipeline into the overflow buffer. IP "B" is saved in the overflow buffer until I-cache returns code data and IAU matches IP "B" with that fetched code data.

At cycle 4–5, for example, the ICACHE_MISS stall signal remains active. At cycle 6, the ICACHE_MISS stall signal is deactivated which causes IP "D" to be loaded into the FET stage at cycle 7. During cycle 7, however, the second front-end pipeline is still stalled to allow the first front-end pipeline to re-synchronize with the second front-end pipeline as shown at cycle 8.

Figure 8:
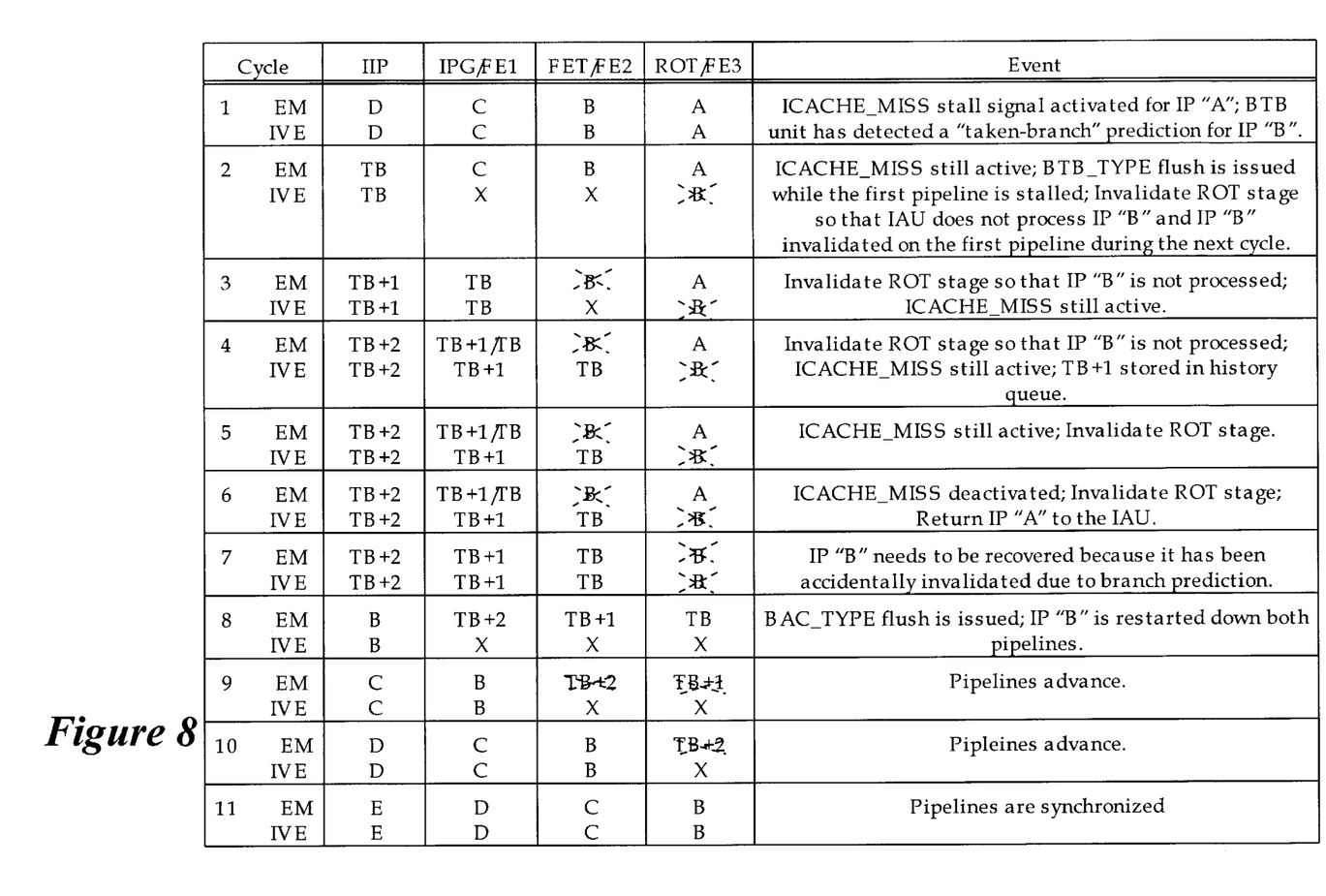
FIG. 8 is an illustrative embodiment of the synchronization scheme of FIG. 4 in response to a branch target buffer (BTB) prediction in combination with a ICACHE_MISS stall condition.

Referring to FIG. 8, a table illustrating the contents of the multiple front-end pipelines in response to an ICACHE_MISS stall signal in combination with a BTB prediction as shown. Normally, during a stall condition, the BTB unit does not predict. However, due to the signal latency, it is possible for the BTB unit to begin prediction oblivious to the fact that an ICACHE_MISS stall signal has been activated. In this case, BTB prediction is allowed to continue by causing a BTB_TYPE flush condition to occur during the next cycle.

This causes information in particular stages of the first front-end pipeline to become unnecessarily invalidated as shown below.

At cycle 1, the first circuit activates an ICACHE_MISS stall signal to signal that the contents of IP "B" were not located in the I-cache. However, due to signal latency, the second circuit initiates a BTB_TYPE flush at cycle 2 unaware of this stall condition. The BTB_TYPE flush causes a predicted IP (referred to as "TB"), which is the target of a branch prediction associated with IP "B", to be loaded into the IIP stages of both front-end pipelines and causes the IPs associated with the FE1 and FE2 stages to be invalidated. Since the ICACHE_MISS stall signal is still active during cycle 2, the second circuit invalidates IP "B" in the first front-end pipeline.

At cycle 3, an IP sequential to TB (referred to as "TB+1") is loaded into the IIP stage of both front-end pipelines while IP "B" of the first front-end pipeline is invalidated. At cycle 4, TB+1 is advanced to the history queue associated with the IPG stage and advanced to the EE1 stage of the second front-end pipeline while the next subsequent IP (TB+2) is now loaded into both IP stages. At cycle 5, ICACHE_MISS stall signal is still active. For cycle 6, ICACHE_MISS stall signal is deactivated which causes TB to be advanced to the FET stage in cycle 7.

While the front-end pipelines appear to be resynchronized, IP "B" has been invalidated thereby disrupting the pipelines. Thus, at cycle 8, a BAC_TYPE flush is activated which invalidates the in-flight IPs of the FE1, FE2 and FE3 stages and re-loads IP "B" into the IIP stages of the front-end pipelines. Thereafter, if not further events produce a stall or flush condition as shown in cycles 9–11, the front-end pipelines become synchronized.

It will be evident that various modifications and changes may be made to the present invention without departing from the broader spirit and scope of the invention as set forth in the appended claims. The specification and drawings are, accordingly to be regarded in an illustrative rather than a restrictive sense.

What is claimed is:

1. A method comprising:

advancing corresponding information along a plurality of front-end pipelines, the plurality of front-end pipelines are in parallel and synchronous to each other;

undergoing a stall condition by each of the plurality of front-end pipelines, the stall condition causing the plurality of front-end pipelines to become asynchronous to each other;

invalidating information in at least one selected processing stage of each of the plurality of front-end pipelines;

reloading corresponding information into each of the plurality of front-end pipelines; and advancing a first front-end pipeline of the plurality of front-end pipelines upon deactivating the stall condition while a second front-end pipeline of the plurality of front-end pipelines remains idle for a predetermined number of time cycles until the first front-end pipeline becomes synchronous with the second front-end pipeline.

2. The method of claim 1, wherein the corresponding information is identical to the invalidate information.

3. The method of claim 2, wherein the undergoing of the stall condition includes:

stalling the first front-end pipeline of the plurality of front-end pipelines during a first cycle; and stalling the second front-end pipeline of the plurality of front-end pipelines during a second cycle, the second cycle occurs subsequent in time to the first cycle.

4. The method of claim 3, wherein prior to stalling the first front-end pipeline, the undergoing of the stall condition further includes detecting the stall condition during the first cycle by circuitry controlling the first front-end pipeline.

5. The method of claim 4, wherein prior to stalling the second front-end pipeline, the undergoing of the stall condition further includes providing a signal to circuitry controlling the second front-end pipeline to indicate the stall condition has occurred.

6. The method of claim 1 further comprising performing a plurality of operations to synchronize the plurality of front-end pipelines with each other.

7. The method of claim 1, wherein the information includes at least one instruction pointer.

8. The method of claim 7, wherein the stall condition includes an event where a translation lookahead buffer is unable to timely service the at least one instruction pointer during a predetermined processing stage of the first front-end pipeline.

9. The method of claim 7, wherein the stall condition includes an event where no translation is resident in a translation lookahead buffer for the at least one instruction pointer.

10. The method of claim 7, wherein the stall condition includes an event where no information associated with the at least one instruction pointer is resident in a predetermined cache memory.

11. The method of claim 6, wherein the performing of the plurality of operations to synchronize the plurality of the front-end pipelines includes:
  invalidating information in at least one selected processing stage of each of the plurality of front-end pipelines;
  reloading corresponding information into each of the plurality of front-end pipelines; and
  advancing a first front-end pipeline of the plurality of front-end pipelines upon deactivating the stall condition while a second front-end pipeline of the plurality of front-end pipelines remains idle for a predetermined number of time cycles until the first front-end pipeline becomes synchronous with the second front-end pipeline.

12. The method of claim 11, wherein the reloading comprises:
  retrieving information from an overflow buffer, the overflow buffer receiving information output from the second front-end pipeline; and
  concurrently loading the information retrieved from the overflow buffer into both the first front-end pipeline and the second front-end pipeline.

13. An electronic system comprising:
  a bus; and
  a microprocessor coupled to the bus, the microprocessor including
    a first circuit to control advancement of information along a first front-end pipeline, the first circuit includes a history queue to maintain at least two instruction pointers to one processor stage of the first front-end pipeline, the history queue includes a multiplexer including (i) a first input receiving a first instruction pointer of the at least two instruction pointers and (ii) a second input connected to a storage element containing at least a second instruction pointer of the at least two instruction pointers, an output of the multiplexer is controlled by activation and deactivation of the stall condition a stall condition.

14. The electronic system of claim 13, wherein the information includes a plurality of sequential instruction pointers.

15. The electronic system of claim 13, wherein the first circuit to detect the stall condition.

16. The electronic system of claim 13, wherein the microprocessor further including a second circuit to control advancement of information along a second front-end pipeline and to operate in cooperation with the first circuit to maintain a synchronous relationship between the first front-end pipeline and the second front-end pipeline.

17. The electronic system of claim 13, wherein the first circuit has access to contents of a cache memory.

18. The electronic system of claim 13, wherein the second circuit includes a buffer to temporarily store information output from the second front-end pipeline in a preceding clock cycle.

19. The electronic system of claim 18, wherein the second circuit further includes a branch target buffer to obtain information from the buffer to be subsequently reloading into both the first front-end pipeline and the second front-end pipeline.

20. A microprocessor comprising:
  a first circuit to control advancement information along a first front-end pipeline, the first circuit including a history queue to maintain at least two instruction pointers in one processing stage of the first front-end pipeline, the history queue includes a multiplexer including (i) a first input receiving a first instruction pointer of the at least two instruction pointers and (ii) a second input coupled to a storage element containing a second instruction pointer of the at least two instruction pointers, an output of the multiplexer being controlled by activation and deactivation of a stall condition; and
  a second circuit coupled to the first circuit, the second circuit to control advancement of information along a second front-end pipeline and to operate in cooperation with the first circuit to maintain a synchronous relationship between the first front-end pipeline and the second front-end pipeline.

21. The microprocessor of claim 20, wherein the first circuit to detect the stall condition.

22. The microprocessor of claim 21, wherein the second circuit includes a buffer to temporarily store information output from the second front-end pipeline in a preceding clock cycle.

23. The microprocessor of claim 22, wherein the second circuit further includes a branch target buffer to obtain information from the buffer to be subsequently reloading into both the first front-end pipeline and the second front-end pipeline.

24. A method comprising:
  advancing corresponding information along a plurality of front-end pipelines, the plurality of front-end pipelines are in parallel and synchronous to each other;
  undergoing a stall condition by the plurality of front-end pipelines, the stall condition causing the plurality of front-end pipelines to become asynchronous to each other; and
  performing a plurality of operations to synchronize the plurality of front-end pipelines to each other, including
    invalidating information in at least one selected processing stage of each of the plurality of front-end pipelines, reloading corresponding information into each of the plurality of front-end pipelines, and advancing a first front-end pipeline of the plurality of front-end pipelines upon deactivating the stall condition and a second front-end pipeline of the plurality of front-end pipelines remains idle until the first front-end pipeline becomes synchronous with the second front-end pipeline.

25. An electronic system comprising:

a bus; and a microprocessor coupled to the bus, the microprocessor including a first circuit to control advancement of instruction pointers along a first front-end pipeline and to detect a stall condition, the first circuit including a history queue to maintain at least two instruction pointers at one processing stage of the first front-end pipeline, the history queue including a multiplexer having a first input to receive a first instruction pointer of the at least two instruction pointers, a second input coupled to a storage element containing at least a second instruction pointer of the at least two instruction pointers, an output of the multiplexer being controlled by activation of the stall condition, and a second circuit to control advancement of the instruction pointers along a second front-end pipeline and to operate in cooperation with the first circuit to maintain a synchronous relationship between the first front-end pipeline and the second front-end pipeline.

* * * * *